United States Patent [19]

Lathrum

[11] Patent Number: 4,705,179
[45] Date of Patent: Nov. 10, 1987

[54] EASY OUTBOARD MOTOR LOADER

[76] Inventor: Wilford D. Lathrum, 12555 Avondale Rd., Redmond, Wash. 98052

[21] Appl. No.: 912,299

[22] Filed: Sep. 29, 1986

[51] Int. Cl.⁴ ............................................. B66C 23/62
[52] U.S. Cl. .................................. 212/182; 212/187; 212/254; 212/252; 414/462
[58] Field of Search ................ 212/175, 176, 179, 180, 212/182, 187, 188, 254, 232, 252; 414/462, 560; 440/53; 224/310

[56] References Cited

U.S. PATENT DOCUMENTS

| | | |
|---|---|---|
| 270,159 | 1/1883 | Van Patten ........................... 212/180 |
| 382,307 | 5/1888 | Huth ..................................... 212/180 |
| 3,794,192 | 2/1974 | Monson ................................ 212/188 |
| 3,804,263 | 4/1974 | Castonguay ......................... 212/180 |
| 3,888,368 | 6/1975 | Hawkins ............................... 212/180 |
| 4,081,095 | 3/1978 | Wilburn . | |
| 4,381,069 | 4/1983 | Kreck . | |
| 4,406,574 | 9/1983 | Riley . | |
| 4,419,038 | 12/1983 | Pendergraft ......................... 212/182 |
| 4,465,423 | 8/1984 | Anderson . | |

Primary Examiner—Joseph F. Peters, Jr.
Assistant Examiner—Stephen P. Avila
Attorney, Agent, or Firm—Henderson & Sturm

[57] ABSTRACT

A lift mechanism is provided for transferring an outboard motor to and from the body of a pickup truck or the like, being primarily usable in moving the motor from a use position on a boat (or from a temporary stored position on a rack or the like) to the interior of the vehicle. The lift comprises a rectangular frame with a boom that can be swung about a vertical axis during motor transfer and that can be folded within the vehicle when the motor is being transported after being lifted into the vehicle. The frame is further slidable fore and aft in the truck body to facilitate motor handling. A releasable lock is provided for locking the frame in forwardly stored position. The provision for sliding of the frame also includes provision for enabling easy removal of the frame when its use is not required.

4 Claims, 5 Drawing Figures

EASY OUTBOARD MOTOR LOADER

BACKGROUND AND SUMMARY OF THE INVENTION

As is well known, outboard motors for boats are not among the easiest articles to handle, primarily because of their weight and configuration. It is also known that in towing a trailer carrying a boat, it is customary to remove the motor, preferably loading it into the towing vehicle to safeguard it from damage, theft, etc. Many prior arrangements have been resorted to to alleviate the burden of handling the motor, among which are the devices disclosed in such prior Anderson U.S. Pat. No. 4,465,423 and Kreck, U.S. Pat. No. 4,381,069. In the Anderson patent, a sliding support is provided in the back of a pickup truck, but this has no means for lifting and lowering a motor. In Kreck, an arm is pivoted rearwardly of the closed truck tailgate on a fore-and-aft axis for swinging the motor from a lowered position to a raised position. There is no mechanism for storing the motor within the vehicle body. The Riley U.S. Pat. No. 4,406,574 shows a power-operated lift device carried in the trunk of an automotive vehicle. This is not intended for outboard motors and does not possess a sliding base or frame. A rather remote arrangement is shown in the Wilburn U.S. Pat. No. 4,081,095 for lifting and storing articles on a vehicle roof.

The present invention offers many advantages over this prior art, such as ease of operation, ready mounting in and dismounting from a truck bed, compactness and low-cost design and utility even in a van or pickup equipped with a "topper", so that the transported motor is stored and cradled safely within the van or topper. Further, the device is slidable rearwardly to extend the "reach" of its boom in handling the motor to and from the vehicle as respects either the transom of a boat or a ground-supported motor support.

Further features and advantages will become apparent as a preferred embodiment of the invention is disclosed in the ensuing description and accompanying drawings.

DETAILED DESCRIPTION OF A PREFERRED EMBODIMENT OF THE INVENTION

Figure 1:
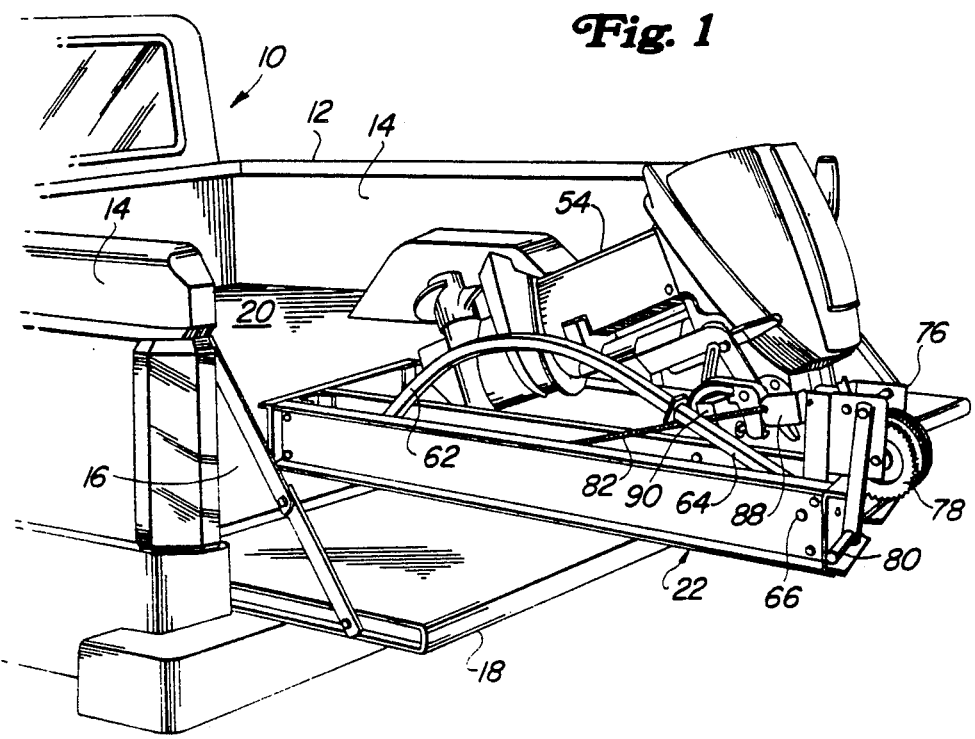
FIG. 1 is a perspective of the device shown with a motor stored thereon in a rearward mode just prior to raising the boom for lifting the motor.
Figure 2:
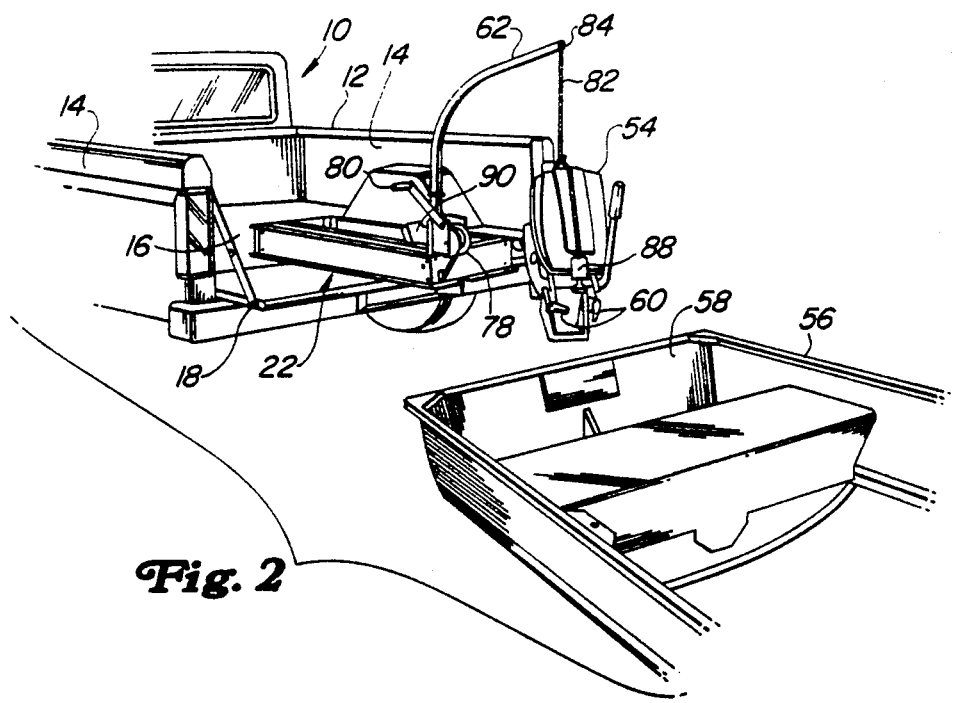
FIG. 2 is a similar perspective, on a smaller scale, showing the boom carrying the motor for lowering thereof into position on the transom of a typical boat.

Reference will be had first to FIGS. 1 and 2 for a general overview of the invention. The numeral (10) denotes in general a typical pickup truck or like vehicle having a fore-and-aft body (12) including side walls (14) and an open rear end (16) closable by a tailgate (18), here shown in its down position, typically as a rearward horizontal extension of a floor or bed (20) of the body.

The loading and unloading device or mechanism is denoted in its entirety by the numeral (22) and comprises an essentially rectangular frame (24) made up of fore-and-aft side sills (26) and front and rear cross members (28) and (30), preferably constructed of aluminum and bolted rigidly together. The frame also has as a rigid part thereof an intermediate fore-and-aft member (32) of channel shape, augmented by a parallel angle member (34) spaced from the member (32) to afford a fore-and-aft channel or groove (36) which forms part of slide means for mounting the frame for fore-and-aft sliding in the truck, as will presently appear.

Figure 4:
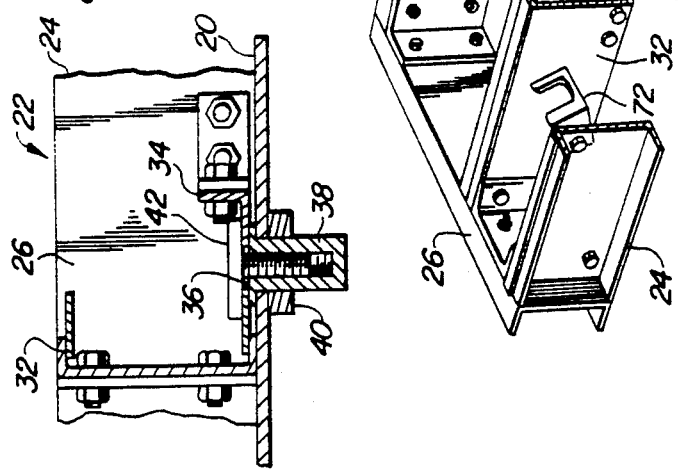
FIG. 4 is an enlarged, fragmentary section showing how the frame is mounted for fore-and-aft sliding in the vehicle body.
Figure 5:
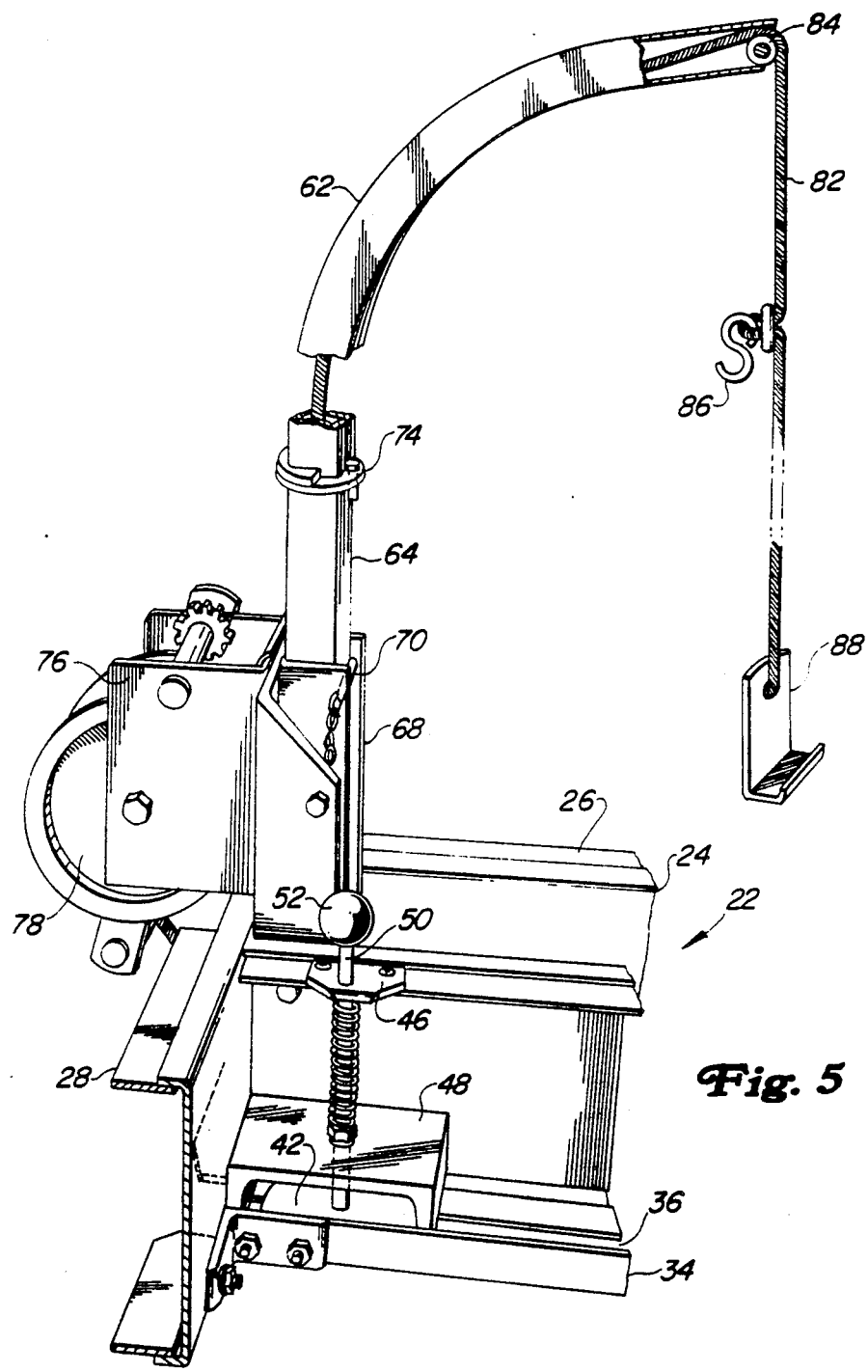
FIG. 5 is an enlarged perspective showing the boom in raised position and further illustrating the winch and means for locking the frame to the vehicle bed.

A preferred system for sliding the frame (22) is shown in FIG. 4. The floor or bed of the body is drilled and fitted with a member (38) inserted from above and held captive in the bed by a nut (40). The member is internally threaded so as to receive the threaded stem of a T-headed element (42), the head of which bridges are slide channel in a fit sufficiently loose to enable sliding of the frame (22) as described above. Since the front end of the frame is closed by the front cross member (26), the frame cannot inadvertently escape rearwardly from the truck body. When desired, the T-element may be unthreaded and removed so as to enable removal of the frame from the body for cargo-carrying purchases and the like. As best shown in FIG. 5, a rear part of the frame carries suitable upper and lower support brackets (46), below which is an inverted U-shaped gate (48) attached to the lower end of an elongated pin (50) which is slidable in the bracket (46) and spring-loaded for downwardly biased vertical movement to engage the gate (48) with the head of the T-element (42). The upper end of the pin is fitted with a knob for convenience in manually lifting the pin so that the gate (48) the T-element (42). When the gate engages in the T-element, the frame is held against rearward movement, thus keeping the frame and associated parts in the forward position in the truck body. Any suitable means may be used to limit upward movement of the pin (50).

Figure 3:
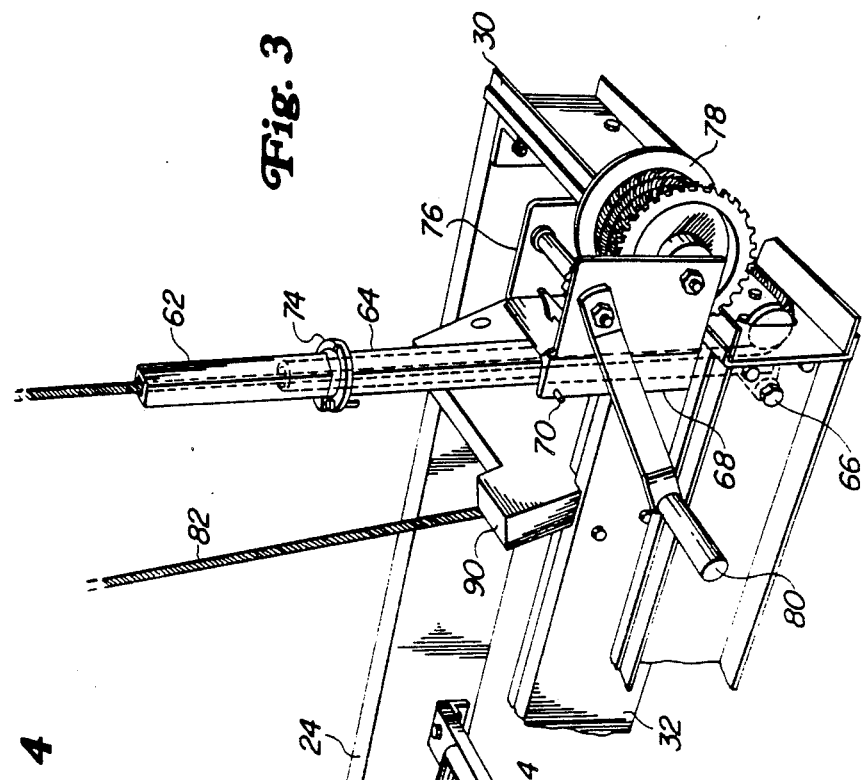
FIG. 3 is an enlarged perspective showing the boom in raised position and with parts broken away and some shown in section to illustrate the construction of the frame.

FIG. 2 illustrates a typical situation involving transfer of an outboard motor (54) between the truck and a boat (56) having a transom (58) of usual configuration. Normally, the boat will be at a level considerably below that of the truck, requiring at least a limited amount of lifting of the motor during its transfer between the truck and transom. At times, it may be desired to support the motor on a temporary support (not shown) which typically has a part simulating a transom to which the motor may be mounted by means of its usual transom clamps (60). In any event, the present device eases the burden of moving the motor by the provision of a boom (62), preferably of square aluminum or light steel tubing and of "goose neck" shape as shown. The lower end of the boom is mounted to the frame by means enabling the boom to turn about an upright axis and also to fold about a horizontal axis. This means takes the form of a lower, upright support (64) of tubular construction which is pivoted or hinged to a rear part of the frame by a cross pivot (66). This rear part of the frame includes a rigid member in the form of a forwardly opening channel (68) to which the lower end of the boom part or support (64) is hinged or pivoted as just described and in which this boom part nests when in its upright position (FIGS. 2, 3 and 5). A latch pin (70) is used to removably lock the boom in its upright position. The folded position of the boom is shown in FIG. 1, in which position the boom lies lengthwise along the frame in a relatively low status so as to easily fit within a van or topper or the like. FIG. 3 shows at (72) a retainer or saddle to receive the upper end part of the boom in folded position.

Another part of the means for mounting the boom on the frame includes a swivel or small turntable (74) that forms a connection on a vertical axis between the boom and the lower part (64), which enables the boom to turn at least through 180° between inboard and extended positions as respects the truck body. That is, the inboard position occurs when the boom is swung forwardly about the turntable to dispose its free or upper end in overhanging relation to the frame (FIG. 5). The extended position occurs when the boom is turned about the turntable to the position shown in FIG. 2. Any suitable design may be resorted to to effect the turntable.

A further part of the structure including the channel (68) is a rigid bracket (76) that extends to the rear and supports a winch (78) operated by a cranked handle (80) for payng out and taking in a rope or cable (82). The rope is suitably guided through the hollow boom and is trained over a sheave (84) at the upper end of the boom. The terminal end portion of the rope or cable is provided with a pair of hook elements (86) and (88) for attachment to the motor to be transported. The two hooks are provided to increase the versatility of the connection to the motor and to accommodate attachment to motors of various configurations so far as concerns lifting points.

For lifting the motor from the boat to the frame (22), the latter is unlocked and slid to its rear position and the boom is erected and locked at (70) and turned to its position overhanging the rear end of the boat carrying the motor, the truck having previously been maneuvered into proper position. The rope is payed out sufficiently to enable connection thereof to the motor via (86)-(88) and the motor clamps (60) are released from the transom. The motor is then lifted by the winch to a proper height and the boom turned about its turntable so as to overhang the frame (22), after which the winch is used to slowly lower the motor, which will be guided by hand to the cradle means comprising the members (90) and (92). The motor clamps are used to clamp the motor to the member (90), and the boom is unlocked and folded forwardly (FIG. 1).

As seen in FIG. 3, the frame is provided with means for accommodating the motor when placed on the frame. Part of this means includes cross member (90) to which the motor may be clamped via its clamps (60). The other part of this means is a padded cross member (92) on which the lower part of the motor rests during its transport mode. As seen, the member (90) is sloped upwardly and forwardly and the proper spacing is provided between it and the member (92) to handle typical motors safely and securely. After the motor is stored as aforesaid, the boom is folded downwardly and forwardly. It will be noted that the area into which the boom folds is offset laterally from the area in which the members (90) and (92) are disposed, thus avoiding interference between the boom and motor during transport.

When the motor is to be transported or transferred to the boat, the frame (22) is unlocked at (50)/(44) and slid to the rear via the open tailgate until it reaches its stopped rear position. The clamps (60) are released from the member (90) and the rope, if disconnected from the motor previously, is reconnected; although, normally the connection of the rope to the motor will have been retained. The rope is payed out from the winch sufficiently to enable the boom to be raised to and locked in its upright position while overhanging the motor and frame. The winch is used to raise the motor clear of the frame and the boom is then turned toward the FIG. 2 position, depending upon the relative locations of the truck and boat, after which the winch is used to lower the motor into place on the transom, normally requiring only one hand on the winch crank and the other guiding the lowering motor. After unloading of the motor, the boom may be folded and the frame slid forwardly in the truck if desired.

The foregoing has presented the salient features of the invention and the design and operation of a preferred embodiment. Other features and advantages will occur to those versed in the art, as will many alterations in the disclosed construction, all without departure from the spirit and scope of the invention.

I claim:

1. An outboard motor lift for use with a motor vehicle including fore-and-aft side walls and a floor defining a cargo bed having an open rear end, a loading and unloading device for transferring an outboard motor to and from the bed, comprising a rectangular frame adapted to rest on the bed floor and having a pair of fore-and-aft side sills and front and rear end members cross-connecting the sills, a boom disposed at the rear end member in a load-handling position and including an upright lower part and an overhanging upper part, means mounting the boom on the frame and including an upright pivot carrying the boom lower part for swinging about a vertical axis from an inward position in which the overhanging part is above the frame to an outward position in which the overhanging part extends rearwardly of the frame, said means further including a transverse pivot mounting the boom for selective swinging out of its load-handling position to a folded position lying lengthwise of the frame, means for releasably locking the the boom in its load-handling position, a sheave on the overhanging part of the boom, and a winch carried by the frame and including a flexible element trained over the sheave and having a free end adapted for releasable connection to an outboard motor, fore-and-aft slide means connecting the frame to the floor for selective disposition to the frame relative to the bed in a forward, retracted position and a rearward extended position, said slide means including a fore-and-aft channel on the frame and a guide affixed to the bed floor and received in the channel, said channel having laterally spaced apart marginal lips facing each other to provide a fore-and-aft groove and the guide has a neck fitting the groove and an integral head engaging the lips from above to confine the frame against upward movement.

2. The device of claim 1, in which the floor fixedly carries an insert having a vertical tapped bore and the neck is externally threaded and screwed into the bore.

3. An outboard motor lift for use with a motor vehicle including fore-and-aft side walls and a floor defining a cargo bed having an open rear end, a loading and unloading device for transferring an outboard motor to and from the bed, comprising a rectangular frame adapted to rest on the bed floor below the level of the tops of the vehicle side walls and having a pair of fore-and-aft side sills and front and rear end members cross-connecting the sills, a boom disposed at the rear end member in a load-handling position and including an upright lower part and an overhanging upper part, means mounting the boom entirely on the frame and independently of the cargo bed and including an upright pivot carrying the boom lower part for swinging about a vertical axis from an inward position in which the overhanging part is above the frame to an outward position in which the overhanging part extends rearwardly of the frame, said means further including a transverse pivot mounting the boom for selective swinging out of its load-handling position to a folded position lying lengthwise of the frame and within the cargo bed, means for releasably locking the the boom in its load-handling position, a sheave on the overhanging part of the boom, and a winch carried by the frame and including a flexible element trained over the sheave and having a free end adapted for releasable connection to an outboard motor.

4. The device of claim 3, including cradle means on the frame ahead of the boom for carrying the outboard motor in a stored position on the frame.

* * * * *